United States Patent [19]
Maher

[11] Patent Number: 6,003,894
[45] Date of Patent: Dec. 21, 1999

[54] VEHICLE FOR TRANSPORTING A BAG OR THE LIKE

[75] Inventor: Jay A. Maher, Lake Barrington, Ill.

[73] Assignee: Nelson-Whittaker, Ltd., Cary, Ill.

[21] Appl. No.: 09/099,966

[22] Filed: Jun. 19, 1998

[51] Int. Cl.⁶ .................................................. B62B 1/00
[52] U.S. Cl. ...................... 280/639; 280/33.992; 248/99; 248/100
[58] Field of Search .......................... 280/33.991, 33.992, 280/47.35, 639, 644, 651, 654; 248/95, 98, 99, 100

[56] References Cited

U.S. PATENT DOCUMENTS

| | | | |
|---|---|---|---|
| 2,992,011 | 7/1961 | Becan | 280/36 |
| 3,375,018 | 3/1968 | Close | 280/33.99 |
| 3,802,620 | 4/1974 | Ferrara | 248/99 |
| 4,549,748 | 10/1985 | Haley, Sr. | 280/641 |
| 5,263,672 | 11/1993 | He | 248/97 |
| 5,265,892 | 11/1993 | Said | 280/30 |

*Primary Examiner*—Paul N. Dickson
*Assistant Examiner*—Lynda Jasmin
*Attorney, Agent, or Firm*—Lee, Mann, Smith, McWilliams, Sweeney & Ohlson

[57] ABSTRACT

A vehicle for transporting a removable product carrier having a pair of handles, such as a bag. The vehicle has a wheeled frame and a pivotal forward frame member which can be collapsed against the frame or positioned at a predetermined pivotal orientation in relation to the frame. A pair of suspension brackets, one each on the forward frame member and the frame, engage the handles of the product carrier to suspend it in the vehicle.

14 Claims, 2 Drawing Sheets

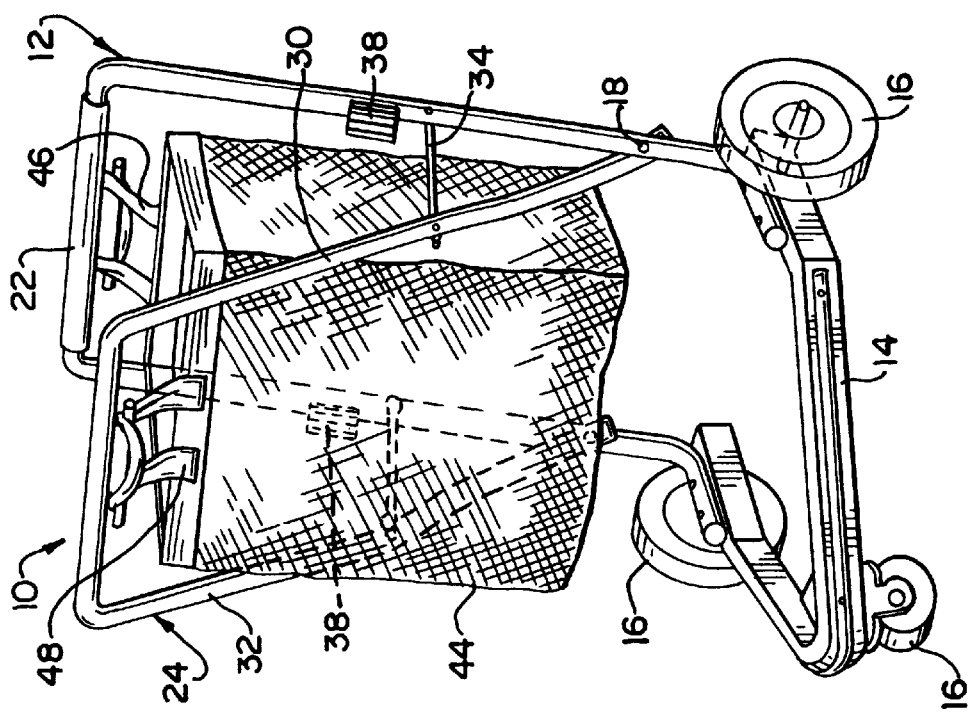
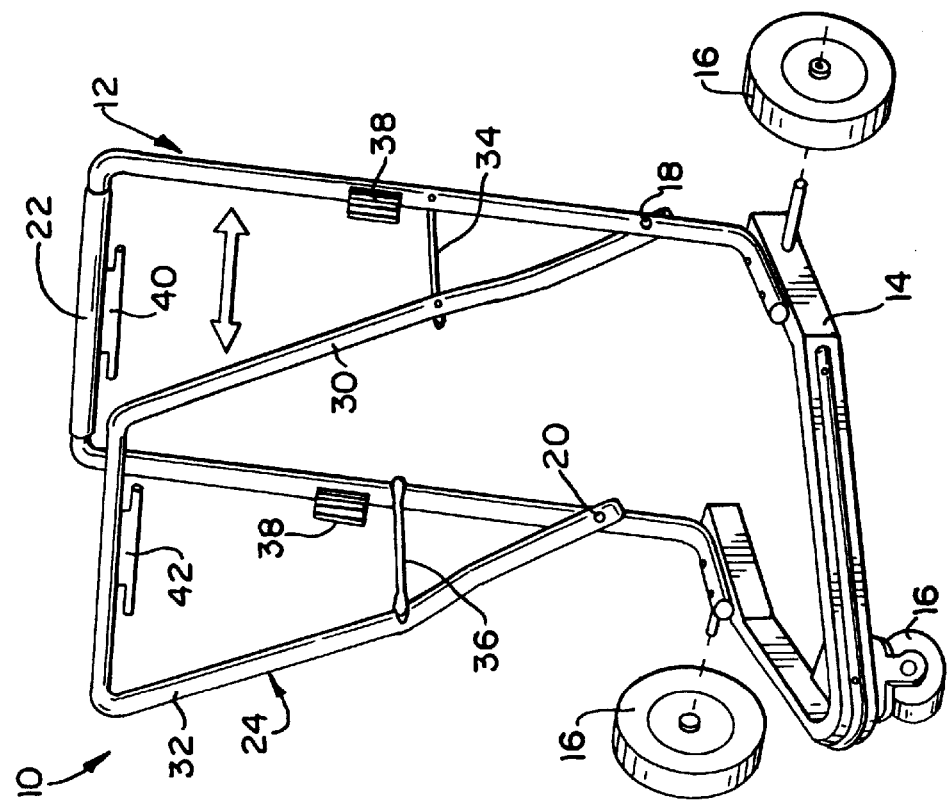

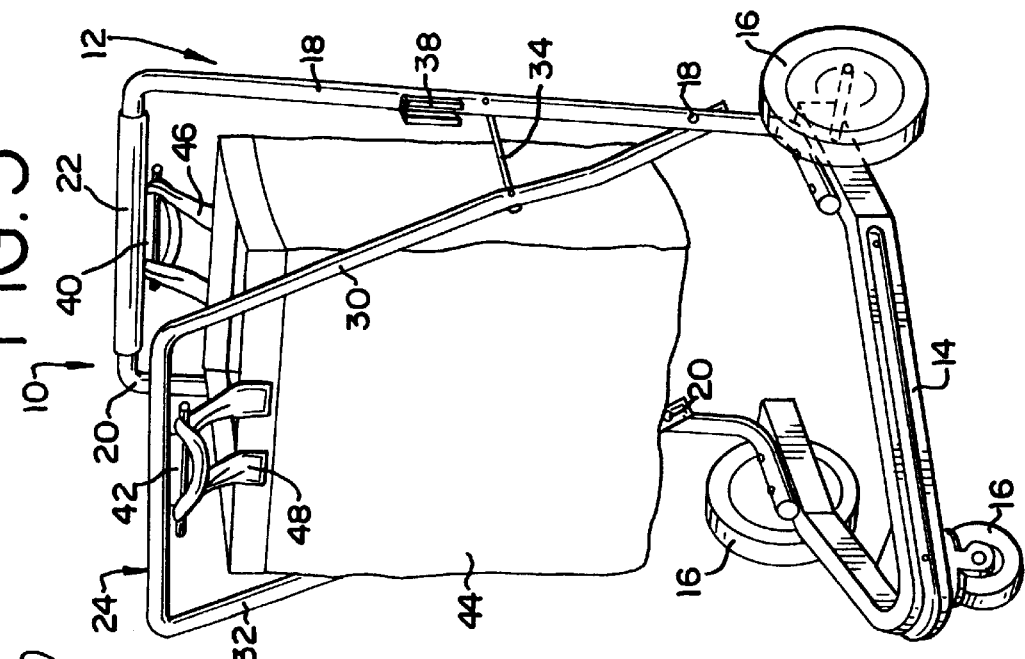
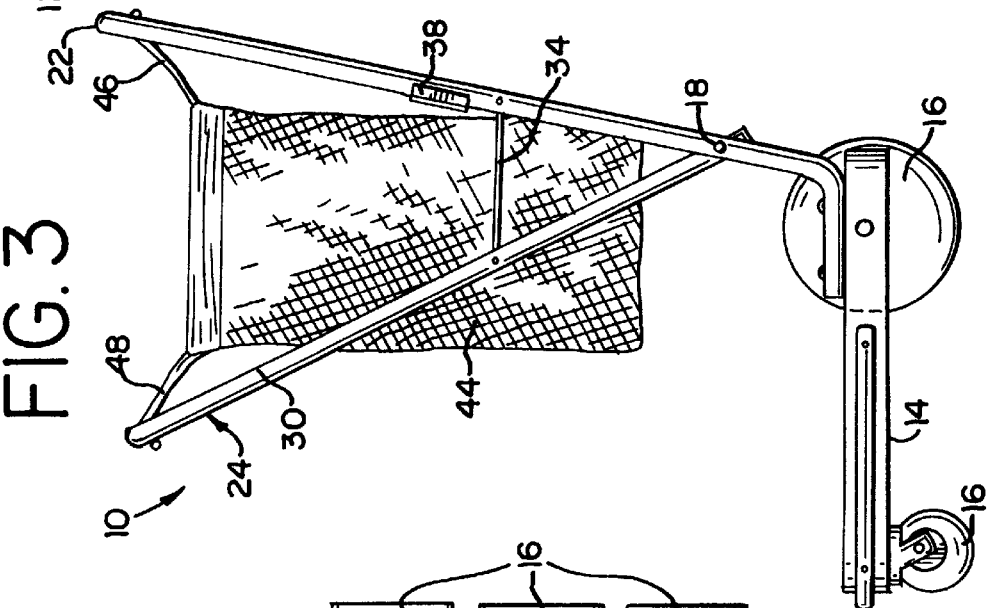
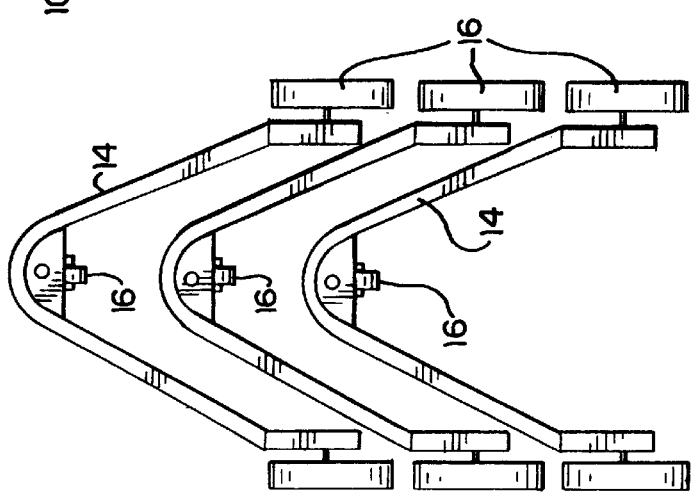

6,003,894

VEHICLE FOR TRANSPORTING A BAG OR THE LIKE

BACKGROUND OF THE INVENTION

This invention relates to vehicles for transporting products, and in particular to a vehicle for transporting a removable product carrier which is suspended from a pair of handles.

Shopping bags, whether they are simple paper bags, cloth bags, or other similar structures, are often provided with a pair of handles. When the bag is used for shopping or carrying of products, often it is desired to have the bag transported separately, due to the weight of the bag, a disability of the person transporting the bag, or simply due to the shear number of bags being carried. Accordingly, bags often are set in a shopping cart or various other types of wheeled totes, for ease of mobility.

While such implements serve the purpose of carrying a bag, they are often bulky, and since they are not designed specifically for carrying a bag, often make transportation of the bag practically as difficult as carrying the bag itself.

SUMMARY OF THE INVENTION

The invention is directed to a vehicle for transporting a removable product carrier having a pair of handles. The vehicle comprises a frame having an upright portion with means mounting the frame for mobility. A forward frame member is pivotally secured to the frame, and means is provided, secured to the frame and the forward frame member, for positioning the forward frame member at a predetermined pivotal orientation in relation to the frame. First means is also provided on the upright portion for engaging one of the pair of handles of the product carrier and second means is provided on the forward frame member for engaging the other of the pair of handles so that the product carrier is suspended from the upright portion and the forward frame member by the pair of handles.

In accordance with the preferred form of the invention, the mounting means comprises a plurality of wheels. The frame includes a base portion, with the wheels secured to the base portion and with the upright portion being attached to and extending from the base portion.

It is preferred that the vehicle be nestible. To that end, the base portion is formed of opposite members extending in an open, generally V-shaped or U-shaped framework.

The means for positioning the forward frame member in relation to the frame comprises at least one tether which is secured between the forward frame member and the upright portion. In the preferred form of the invention, the forward frame member and the upright portion each comprise tubular members having spaced legs. A pair of tethers is employed, with each tether being flexible and extending between a leg of the upright portion and a leg of the forward frame member.

The first means and the second means each comprise a suspension bracket. Each suspension bracket is formed of a shank which can be secured to the vehicle and opposite wings for engaging a handle.

BRIEF DESCRIPTION OF THE DRAWINGS

The invention is described in greater detail in the following description of an example embodying the best mode of the invention, taken in conjunction with the drawing figures, in which:

The invention is described in greater detail in the following description of an example embodying the best mode of the invention, taken in conjunction with the drawing figures, in which:

FIG. 1 is a perspective assembly view of a vehicle according to the invention, without its supported product carrier, FIG. 2 is a perspective view similar to FIG. 1, but with the vehicle assembled and suspending the product carrier, FIG. 3 is a side elevational illustration of the vehicle illustrated in FIG. 2, FIG. 4 is a top plan view of three of the vehicles according to the invention, showing their nestability and with all upright portions removed for clarity, and FIG. 5 is an enlarged perspective view of a vehicle according to the invention.

DESCRIPTION OF AN EXAMPLE EMBODYING THE BEST MODE OF THE INVENTION

A vehicle according to the invention is illustrated generally at 10 in the drawing figures. The vehicle 10 includes a frame having an upright portion 12 secured to a base portion 14. A series of wheels 16 are secured to the base portion in any conventional fashion for permitting mobility of the vehicle in a well-known manner. While a series of wheels 16 is preferred, it should be evident that other means of providing mobility, such as glides or other means to facilitate transportation of the vehicle, can be used.

As illustrated, the base portion is formed of opposite members which comprise an open, generally V-shaped or U-shaped framework. That shape promotes nesting of a series of vehicles 10, as illustrated in FIG. 4. However, other shapes for the base portion can be employed, depending on the desired utility of the vehicle 10.

As illustrated, the upright portion 12 is preferably composed of a tubular member having opposite spaced legs 18 and 20 with a handle 22 between the legs 18 and 20. The legs 18 and 20 are appropriately secured to the base member by bolts, screws, welding, or any other well-known manner. Also, while the upright portion 12 is preferably a tubular member, formed of metal, it obviously can be formed of any appropriate material, as desired.

A forward frame member 24 is pivotally secured at a pair of pivot points 26 and 28 to the legs 18 and 20. Similar to the upright portion 12, the forward frame member 24 is preferably a tubular member having a pair of spaced legs 30 and 32, although again, one skilled in the art can form the forward frame member of any appropriate material so long as it functions as described herein.

A pair of tethers 34 and 36 are secured between the upright portion 12 and the forward frame member 24, with the tether 34 extending between the legs 18 and 30, and the tether 36 extending between the legs 20 and 32. Preferably, the tethers 34 and 36 are flexible members, such as ropes, chains and the like, and are sized such that the forward frame member 24 can be positioned, as illustrated, at a predetermined pivotal orientation in relation to the upright portion 12. When a series of the vehicles 10 are nested as illustrated in FIG. 4, the forward frame members 24 can be pivoted against the upright portions 12 to permit nesting. When the forward frame member is so-positioned, it can be seated against a pair of appropriate bumpers 38.

A pair of suspension brackets 40 and 42 are provided, the suspension bracket 40 being secured underneath the top of the upright portion 12 and the suspension bracket 42 being secured underneath the top of the forward frame member 24. Each of the suspension brackets 40 and 42 is composed of a shank with opposite extending wings, as perhaps best illustrated in FIGS. 1 and 5.

An open-mouth bag 44 is shown suspended in the vehicle 10. The bag 44, as is conventional, has opposite handles 46 and 48 which, as illustrated, are engaged on the respective suspension brackets 40 and 42, over the oppositely extending wings thereof. Otherwise, as illustrated, the bag 44 is not supported on the vehicle 10 by any other means. It is therefore suspended between the upright portion 12 and the forward frame member 24, and can be filled as desired.

While an open mesh bag 44 is illustrated in FIGS. 2 and 3, it should be evident that any type of product carrier having a pair of handles can be employed. While the vehicle 10 is formed to suspend a bag, it could also be utilized to support anything that can be suspended from the brackets 40 and 42.

The vehicle 10 provides a convenient and compact structure for transporting a bag 42, while also being readily nestible. Various changes can be made to the invention without departing from the spirit thereof, or scope of the following claims.

What is claimed is:

1. A vehicle for transporting a removable product carrier having a pair of handles, the vehicle comprising
   a. a frame having an upright portion,
   b. means mounting said frame for mobility,
   c. a forward frame member pivotally secured to said frame,
   d. means secured to said frame and said forward frame member for positioning said forward frame member at a predetermined pivotal orientation in relation to said frame, and
   e. first means on said upright portion for engaging one of said pair of handles and second means in said forward frame member for engaging the other of said pair of handles such that said product carrier is suspended from said upright portion and said forward frame member by said pair of handles, said first and second means each comprising a suspension bracket, each bracket comprising a shank having oppositely extending wings for engaging a handle.

2. A vehicle according to claim 1 in which said mounting means comprises a plurality of wheels.

3. A vehicle according to claim 2 in which said frame includes a base portion, said wheels being secured to said base portion and said upright portion being attached to and extending from said base portion.

4. A vehicle according to claim 3 in which said vehicle is nestible, and said base portion includes opposite members forming an open, generally V-shaped framework.

5. A vehicle according to claim 1 in which said means for positioning comprises at least one tether secured between said forward frame member and said upright portion.

6. A vehicle according to claim 5 in which said upright portion and said forward frame member each comprise tubular members having a first and a second leg, with the legs being spaced.

7. A vehicle according to claim 6 including a pair of said tethers, one tether being flexible and extending between said first legs, and the other tether being flexible and extending between said second legs.

8. A vehicle according to claim 1 in which each suspension bracket extends beneath a part of the frame to which the bracket is attached.

9. A vehicle for transporting a removable product carrier having a pair of handles, the vehicle comprising
   a. a frame having an upright portion,
   b. a plurality of wheels mounting said frame for mobility,
   c. a forward frame member pivotally secured to said frame,
   d. at least one tether secured to said upright portion and to said forward frame for positioning said forward frame member at a predetermined pivotal orientation in relation to said upright portion and,
   e. a first suspension bracket shaped to engage one of said pair of handles and a second suspension bracket shaped to engage the other of said handles, one of said suspension brackets being secured to said forward frame member and the other of said suspension, brackets being secured to said upright portion, each bracket comprising a shank having oppositely extending wings for engaging a handle.

10. A vehicle according to claim 9 in which said upright portion and said forward frame member each comprise tubular members having a first and a second leg with the legs being spaced.

11. A vehicle according to claim 10 including a pair of said tethers, one tether being flexible and extending between said first legs, and the other tether being flexible and extending between said second legs.

12. A vehicle according to claim 9 in which each suspension bracket extends beneath a part of the frame to which the bracket is attached.

13. A vehicle according to claim 9 in which said frame includes a base portion, said wheels being secured to said base portion and said upright portion being attached to and extending from said base portion.

14. A vehicle according to claim 13 in which said vehicle is nestible, and said base portion includes opposite members forming an open, generally V-shaped framework.

* * * * *